Figure 1:
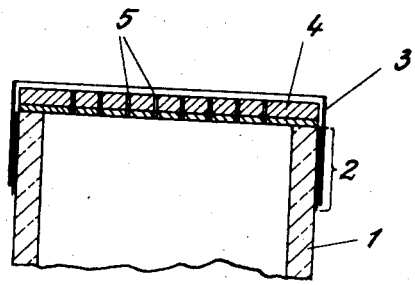

Oct. 18, 1938.   H. VATTER   2,133,492
METHOD FOR MANUFACTURING VACUUM VESSELS
Filed July 22, 1937

Inventor
Hans Vatter
By Knight Bros.
His attorneys

Patented Oct. 18, 1938

2,133,492

UNITED STATES PATENT OFFICE 2,133,492

METHOD FOR MANUFACTURING VACUUM VESSELS

Hans Vatter, Berlin-Charlottenburg, Germany, assignor to Siemens & Halske, Aktiengesellschaft, Siemensstadt, near Berlin, Germany, a corporation of Germany Application July 22, 1937, Serial No. 154,987
In Germany July 24, 1936

12 Claims. (Cl. 250—27.5)

My invention relates to a method for manufacturing vacuum vessels, particularly electric discharge vessels.

Ceramic materials are being employed to an ever increasing extent in the manufacture of different constructional parts of vacuum vessels, particularly of electric discharge apparatus, since the ceramic materials present advantages over the glass hitherto employed both from a mechanical and thermal point of view. It has already been proposed to entirely avoid the use of glass for the construction of electric discharge vessels and to manufacture the walls of such vessels exclusively of ceramic and metallic parts soldered to one another.

The present invention relates to a method for manufacturing such vessels and lends itself particularly to a large-scale production.

In vessels of the above-indicated character the points of the ceramic parts to be joined are first metallized, according to the invention, by sintering thereon a base metallic powder having a high fusing point, for instance carbonyl iron; whereupon the assembled vessel, preferably together with a plurality of other assembled vessels, is placed in a container capable of being exhausted, in which the production of the desired vacuum, if necessary also, the introduction of a gas, and finally the production of a vacuum-tight bond between the assembled parts of each vessel by the use of a hard solder, are performed in one series of operations. The container in which the above-mentioned process takes place consists preferably of quartz which not only withstands the temperature necessary for the soldering process but is also highly resistant to sudden changes in temperature.

According to the invention the ceramic parts of the vessel may have at least one opening which is covered by a sieve-like perforated plate, about ⅓ of the thickness of which may consist of iron and ⅔ of silver or of a copper-silver alloy. By the arrangement of such a plate, the exhaust tube which, despite its drawbacks, has hitherto been employed, may be dispensed with. The assembled vessels having such perforated plate may be placed in a container consisting, as above mentioned, for instance, of quartz, and may be there first evacuated. The gas contained in the vessels may in this case escape through the perforations arranged in the abovementioned plate and through the other joints to be soldered which are not yet rendered vacuum-tight. As soon as the desired vacuum has been attained the pump may be disconnected; whereupon, if desired, a gas (for instance argon) may be introduced thereinto. According to the invention, a heater, for instance a tubular electric heating body, is then placed over the quartz container, by means of which heating body the temperature required for the soldering process is attained. However, this temperature may also be attained with the aid of a high frequency coil, this method being particularly employed in such cases in which only partial heatings of electric discharge vessels are desired. As is well known, there is a number of electric discharge vessels, whose cathodes, for instance having spiral-shaped parts, are highly sensitive to heat, so that when manufactured according to the above-described method they may give rise to difficulties. In such vessels the wall parts may be first soldered by leaving an opening free for the introduction of the electrode system. The electrode system may then be inserted when the vessel is in a cold state. The opening of the vessel is then covered by a sieve-like perforated plate and the whole is placed in the quartz container. By means of a high-frequency coil of corresponding dimensions a partial heating may be effected for soldering the bores of the plate after the vessels have been exhausted. To properly protect the sensitive electrode system the vessel is further surrounded with a metallic sleeve which leaves only the joint to be soldered uncovered. When heating by means of high frequency, only the joint to be soldered and the metallic shield are heated, whereas the electrode system remains relatively cool.

With the method according to the invention, care must be taken to see that when soldering the perforated plate no temperatures occur which might impair the vacuum tightness of the other soldered joints. To this end, solders of different fusing points are employed. Thus, for instance, the perforated plate may be provided with a layer of a copper silver alloy which has a fusing point of 760 degrees centigrade, whereas the other joints are produced by the use of a silver or copper solder, which metals require soldering temperatures of 950 and 1080 degrees centigrade respectively.

It is sometimes necessary that the cathodes of electric discharge vessels be subjected to a particular heat treatment. To this end, corresponding terminals to which the cathodes of the vessels may be connected, are preferably provided inside the container for the discharge vessels. It is then possible to subject the cathodes to a particular heat treatment independently of the other processes to be effected in the container.

The accompanying drawing shows two modes of practising the method according to the invention.

Fig. 1 shows the portion of a vacuum vessel preferably of a cylindrical shape whose wall 1 is made of a ceramic material. The portion 2 of this wall is metallized by sintering thereon a base powder having a high fusing point and on this metallized portion is soldered a ring 3 with the aid of a copper or silver solder. The opening of the ceramic portion 1 is covered by a plate 4 whose upper part consists of silver or of a silver-copper alloy, whereas the lower part is made of iron. In the plate are arranged perforations 5. If now such a vessel is placed in the quartz container according to the above-described method and heated to the fusing temperature of the silver or the copper-silver alloy, the solder flows into the perforations 5 of the plate, thus providing a vacuum-tight closure for the vessel.

Figure 2:
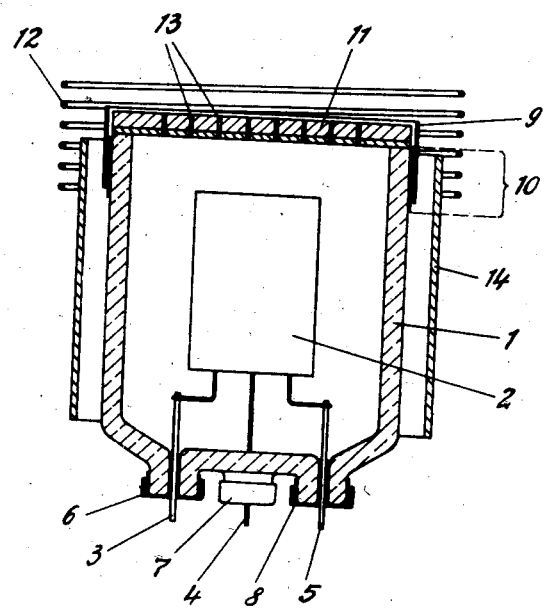

Fig. 2 shows an electric discharge vessel in whose ceramic hollow body 1 an electrode system 2 is arranged which may have a temperature-sensitive element, for instance, in the form of a spiral forming part of the cathode. The leads 3, 4 and 5 are arranged in narrow openings provided in the bottom of the vessel and sealed by the use of metallic caps 6, 7 and 8 with the aid of a hard solder. In the same manner the metallic ring 9 is united as indicated at 10 with the ceramic hollow body 1. When the electrode system is placed in the ceramic hollow body 1, the latter is closed by a plate 11 which is of the same nature as the plate 4 shown in Fig. 1. The vessel thus assembled may then be placed in the quartz container in which first the exhaustion and, if desired, the introduction of a gas may be effected. The upper opening of the vessel covered by the plate 11 is rendered vacuum-tight under the action of the heat developed by a high-frequency coil 12. As soon as the fusing temperature of the solder placed on the plate 11 is attained the perforations 13 are sealed, thereby forming a vacuum-tight closure of the vessel. In order to attain only a partial heating of the joint to be soldered and also to protect the sensitive electrode system against an undesired heating, the vessel may be further surrounded by a metallic sleeve 14 which is at most heated itself, but sufficiently protects the electrode system from attaining unduly high temperatures.

By the method according to the invention it is possible to attain numerous advantages. First of all the simultaneous manufacture of a plurality of vessels is possible, the number thereof depending only upon the capacity of the container in which the exhaustion and the simultaneous soldering process are to be effected. By the partial heating with the aid of a high-frequency coil it is possible to drive out all gas of the metallic parts. Further the getter may be placed inside the discharge vessel at a certain point and caused to evaporate during or after the manufacturing process of the vessels. Furthermore, the novel method removes the drawbacks presented by an exhaust tube, for instance, the increase of the flow resistance when exhausting the vessel, and the undesired escape of introduced gases when disconnecting the vessels from the pump. Finally, the method according to the invention may be carried out in connection with a continuously operating automatic air exhaust arrangement in which the vacuum vessels of smaller dimensions, for instance, vacuum circuit breakers or the like are moved into the vacuum at one side and leave the arrangement at the other side as a completely exhausted vessel.

I claim as my invention:

1. A method for manufacturing vacuum vessels, especially for electrical purposes, whose walls consist exclusively of ceramic and metallic parts, comprising the steps of applying a high fusing base metal in finely divided form onto the bare ceramic surfaces at the joints of said ceramic parts, sintering said metal so as to form layers directly and intimately connected with said ceramic surfaces, assembling the ceramic parts thus prepared with the other parts to a vessel so that the joints of the assembled vessel are bordered by metal, placing said assembled vessel into a container capable of being exhausted, producing a vacuum in said vessel by exhausting said container, and heating the joints of said vessel within said exhausted container so as to fuse said bordering metal to form a vacuum-tight bond.

2. A method for manufacturing vacuum vessels, especially for electrical purposes, whose walls consist exclusively of ceramic and metallic parts, comprising the steps of producing a sintered coating of high fusing base metal on the surface portions to be joined of said ceramic parts, assembling the ceramic parts thus prepared with the other parts of a vessel, placing a plurality of assembled vessels into a container capable of being exhausted, producing a vacuum in said vessels by exhausting said container, and hard soldering the joints of said vessels within said exhausted container to vacuum-tight bonds.

3. A method for manufacturing vacuum vessels, especially for electrical purposes, whose walls consist exclusively of ceramic and metallic parts, comprising the steps of producing a base metallic coating on the surface portions to be joined of said ceramic parts, assembling the ceramic parts thus prepared with the other parts of a vessel and placing hard solder in solid form near the joints of said assemblage, placing a plurality of assembled vessels into a container capable of being exhausted, producing a vacuum in said vessels by exhausting said container, introducing a gas into said vessel by charging said gas into said container, and heating the joints of said vessel within said container so as to cause said hard solder to fuse and to form gas-tight bonds.

4. A method for manufacturing vacuum vessels, in particular electric discharge vessels, whose walls consist exclusively of ceramic and metallic parts, comprising the steps of metallizing the bare ceramic surfaces of the ceramic parts at the places of their joints with finely divided carbonyl iron, sintering said iron so as to form a solid coating in direct and intimate connection with said ceramic surfaces, assembling the ceramic parts thus prepared with the other parts of a vessel, placing a plurality of assembled vessels into a container capable of being exhausted, producing a vacuum in said vessels by exhausting said container, and hard soldering said joints within said exhausted container so as to form permanently vacuum-tight bonds uniting said assembled parts.

5. A method for manufacturing vacuum vessels, especially for electrical purposes, whose walls consist exclusively of ceramic and metallic parts, comprising the steps of applying a high fusing base metal in finely divided form onto the bare ceramic surfaces at the joints of said ceramic parts, sintering said metal so as to form layers directly and intimately connected with said ceramic surfaces, assembling at least one ceramic part thus treated with at least one other part of a vessel and hard soldering the joint of said assembled parts so as to form a vacuum-tight bond, placing a plurality of thus prepared and ready assembled vessels each having at least one unsoldered joint into a common container, producing a vacuum in said vessels by exhausting said container, and hard soldering the remaining joints within said exhausted container so as to form vacuum-tight bonds.

6. A method for manufacturing vacuum vessels, especially for electrical purposes, whose walls consist exclusively of ceramic and metallic parts, comprising the steps of applying a high fusing base metal in finely divided form onto the bare ceramic surfaces at the joints of said ceramic parts, sintering said metal so as to form layers directly and intimately connected with said ceramic surfaces, assembling at least one ceramic part thus treated with at least one other part of a vessel and hard soldering the joint of said assembled parts so as to form a vacuum-tight bond, finishing the assemblage of the vessel, said assemblage including the placing of a metal with hard solder properties near the joints still to be sealed, placing a plurality of assembled vessels into a container capable of being exhausted, producing a vacuum in said vessels by exhausting said container, introducing a gas into said vessels by charging said gas into said container, and heating the joints to be sealed within said container so as to fuse said hard solder metal to a gas-tight bond.

7. A method for manufacturing vacuum vessels, especially for electrical purposes, whose walls consist exclusively of ceramic and metallic parts, comprising the steps of applying a high fusing base metal in finely divided form onto the bare ceramic surfaces at the joints of said ceramic parts, sintering said metal so as to form layers directly and intimately connected with said ceramic surfaces, assembling the ceramic parts thus prepared with the other parts to a vessel and sealing the joints of said assemblage while leaving at least one of said joints unsealed, placing near said unsealed joint a hard solder selected from the group consisting of silver, copper and their alloys, placing a plurality of assembled vessels into a container capable of being exhausted, producing a vacuum in said vessels by exhausting said container, and heating said unsealed joints within said container until said hard solder fuses and forms a vacuum-tight bond.

8. A method for evacuating and sealing ceramic vacuum vessels, especially electric discharge vessels, having an exhaust opening, comprising the steps of producing a high fusing base metallic coating on the ceramic surface portion of the vessel surrounding the exhaust opening, covering said opening by a perforated plate of high fusing base metal, producing a vacuum-tight high fusing bond between said plate and said coating, placing hard solder near the perforations of said plate, placing said vessel into a container, evacuating said container, and heating said plate within said evacuated container so as to cause said hard solder to melt and to vacuum-tightly seal the perforations of said plate.

9. A method for evacuating and sealing ceramic vacuum vessels, especially electric discharge vessels, having an exhaust opening, comprising the steps of closing said opening by a perforated plate of high melting base metal and a high melting base metallic bond between said plate and the ceramic surface of said vessel, said plate having hard solder placed near the perforations, placing said assembled vessel into a container capable of being exhausted, producing a vacuum in said vessel by exhausting said container, and locally heating said plate within said container by employing an electric ring-shaped heating element so as to cause said hard solder to vacuum-tightly seal the perforations of said plate.

10. A method for evacuating and sealing ceramic vacuum vessels, especially electric discharge vessels, having an exhaust opening, comprising the steps of closing said opening by a perforated plate of high melting base metal and a high melting base metallic bond between said plate and the ceramic surface of said vessel, said plate consisting of a layer of high melting metal and a second layer of hard solder having a lower melting temperature than said metal, placing a plurality of assembled vessels into a container capable of being exhausted, producing a vacuum in said vessels by exhausting said container, and heating said perforated plates within said container above the fusing temperature of said hard solder layer so as to cause said solder to seal the perforations of said plate.

11. A method for evacuating and sealing ceramic vacuum vessels, especially electric discharge vessels, having an exhaust opening, comprising the steps of producing a sintered coating of high fusing base metal on the ceramic surface of the vessel surrounding said opening, covering said opening by a perforated plate consisting of a layer of high melting metal and a second layer of hard solder having a lower melting temperature than said metal, providing at the joint between said coating and said plate a hard solder having a lower fusing temperature than said hard solder layer, placing a plurality of vessels into a container, producing in said container the low pressure conditions desired in said vessels, and heating the plates of said vessels within said conditioned container with an increasing temperature in order to first fuse said hard solder so as to form a tight joint between said plate and said coated surface and then fuse said hard solder layer so as to seal the perforations of said plate.

12. A method for manufacturing electric devices having a ceramic enclosure, a set of electrodes in said enclosure, conductors connected with said electrodes and traversing the wall of said enclosure and at least one sealed exhaust opening in the wall of said enclosure, comprising the steps of producing a sintered coating of high melting base metal on the surface portions of said ceramic enclosure adjoining the openings of said enclosure, inserting the electrodes and conductors into said container, sealing the joints between said coated surfaces and said conductors exclusively by hard solder, covering said exhaust opening by a perforated plate of high melting base metal having hard solder located near its perforations and near its joint with said enclosure, placing a plurality of thus prepared devices into an exhaustible container, producing in said container the low pressure conditions desired in said devices, and locally heating said plates within said conditioned container so as to cause said hard solder to form a tight bond between said plate and said enclosure and to seal the perforations of said plate while preventing said electrodes from excessive heating.

HANS VATTER.